US012602426B2

(12) United States Patent
Leatherwood et al.

(10) Patent No.: US 12,602,426 B2
(45) Date of Patent: Apr. 14, 2026

(54) METHOD FOR RESTRUCTURING AUDIO WITHIN AN AUDIO FILE

(71) Applicants:Bradley Evan Leatherwood, Brooklyn, NY (US); Roshni Lulla, Belle Mead, NJ (US)

(72) Inventors: Bradley Evan Leatherwood, Brooklyn, NY (US); Roshni Lulla, Belle Mead, NJ (US)

(73) Assignee: INKIBRA INC., Atlanta, GA (US)

( * ) Notice: Subject to any disclaimer, the term of this patent is extended or adjusted under 35 U.S.C. 154(b) by 194 days.

(21) Appl. No.: 18/175,904

(22) Filed: Feb. 28, 2023

(65) Prior Publication Data

US 2023/0273954 A1     Aug. 31, 2023

Related U.S. Application Data

(60) Provisional application No. 63/314,805, filed on Feb. 28, 2022.

(51) Int. Cl.
| | |
|---|---|
| *G06F 16/638* | (2019.01) |
| *G06F 16/635* | (2019.01) |
| *G10H 1/00* | (2006.01) |

(52) U.S. Cl.
CPC .......... *G06F 16/639* (2019.01); *G06F 16/636* (2019.01); *G10H 1/0025* (2013.01); *G10H 2210/375* (2013.01)

(58) Field of Classification Search
CPC ... G06F 16/639; G06F 16/636; G10H 1/0025;
G10H 2210/375; G10H 2210/061; G10H 2220/371; G10H 2220/395; G10H 2240/085; G10H 2250/311
USPC ............................... 700/94; 600/28; 381/119
See application file for complete search history.

(56) References Cited

U.S. PATENT DOCUMENTS

| | | | | |
|---|---|---|---|---|
| 2002/0166440 | A1* | 11/2002 | Herberger ........... | G10H 1/0041 |
| | | | | 84/625 |
| 2010/0204811 | A1* | 8/2010 | Transeau ............... | G11B 27/34 |
| | | | | 700/94 |
| 2017/0031650 | A1* | 2/2017 | Fraga ..................... | G16H 20/40 |
| 2020/0312287 | A1* | 10/2020 | Galuten ............... | G10H 1/0025 |
| 2021/0208842 | A1* | 7/2021 | Cassidy ................. | G05B 15/02 |
| 2021/0303618 | A1* | 9/2021 | Sheehan ............... | G06F 16/639 |

* cited by examiner

*Primary Examiner* — Duc Nguyen
*Assistant Examiner* — Chimezie Ezeriwe Bekee
(74) *Attorney, Agent, or Firm* — Brooks Kushman P.C.

(57) ABSTRACT

A method remixing/restructuring of audio within an audio file selection includes steps of creating arrangeable music for a musical composition stored as an original audio file and creating a plurality of custom arrangements of the musical composition. Each custom arrangement of the plurality of custom arrangements is tailored to any combination of a location where a custom arrangement is to be played, a day of the week when the custom arrangement is played, an assessment of crowd participation, activity that a user is engaged in, and an assessment of an emotional state of the user. The custom arrangements are provided on-demand to the user for execution, wherein the are executed by a remixing/restructuring system that includes a backend computing device such that at least one of the steps are at least partially executed on a backend computing device.

20 Claims, 8 Drawing Sheets

METHOD FOR RESTRUCTURING AUDIO WITHIN AN AUDIO FILE

CROSS-REFERENCE TO RELATED APPLICATIONS

This application claims the benefit of U.S. provisional application Ser. No. 63/314,805 filed Feb. 28, 2022, the disclosure of which is hereby incorporated in its entirety by reference herein.

TECHNICAL FIELD

In at least one aspect, the present invention relates to computer-implemented products that allow the creation and enjoyment of interactive music.

BACKGROUND

There is a need for improved methods of providing musical compositions to users.

SUMMARY

In at least one aspect, a method for remixing/restructuring of audio within an audio file selection. The method includes steps of creating arrangeable music for a musical composition stored as an original audio file and creating a plurality of custom arrangements of the musical composition. Each custom arrangement of the plurality of custom arrangements is tailored to any combination of a location where a custom arrangement is to be played, a day of the week when the custom arrangement is played, an assessment of crowd participation, activity that a user is engaged in, and an assessment of an emotional state of the user. The custom arrangements are provided on-demand to the user for execution, wherein the are executed by a remixing/restructuring system that includes a backend computing device such that at least one of the steps are at least partially executed on a backend computing device.

In another aspect, a music format that provides an environment for the creation and enjoyment of interactive music is provided. To fans this means that their songs become more expressive, exciting, and entertaining. For producers and artists, this means more power to create music that deeply resonates with fans.

In another aspect, At the core of the format is the ability for a song to change and to define the circumstances and criteria for the song to change. This will allow for limitless, amazing experiences for music fans.

In another aspect, songs can change based on the day of the week. For example, a song about Friday can play a special version on Friday.

In another aspect, songs can change based on location. For example, a song about being in Paris can change when you're in Paris.

In another aspect, songs change based on crowd energy levels. Imagine a song about clubbing, that unlocks a special version if the crowd works for it.

In another aspect, songs change based on user energy levels. Imagine the drums getting more energized as a listener progresses in their workout. Conversely, imagine drums getting more settled when a listener takes a break to relax.

In another aspect, songs change based on type of location. Imagine a laid-back version of a normally aggressive song that plays while studying in a coffee shop, but can morph to a more energized version as the listener leaves.

In another aspect, songs can change to motivate you. Imagine working out and knowing that if you push a little bit harder, your favorite drop or verse will play. In a similar fashion, imagine needing a push and hearing your favorite song in a way that has pushed you or others the most in the past.

In another aspect, songs change your mood. Imagine being stressed out, and being able to play your favorite song in the way that has helped you or other de-stress in the past.

In another aspect, the Recordless format creates many more possibilities, some of which will only be unlocked through the creativity of producers and artists. To this end we need to define the Recordless ecosystem. In this ecosystem, there is a music player, a music editor, a music marketplace, and music analytics.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a further understanding of the nature, objects, and advantages of the present disclosure, reference should be made to the following detailed description, read in conjunction with the following drawings, wherein like reference numerals denote like elements and wherein.

DETAILED DESCRIPTION

Figure 1:
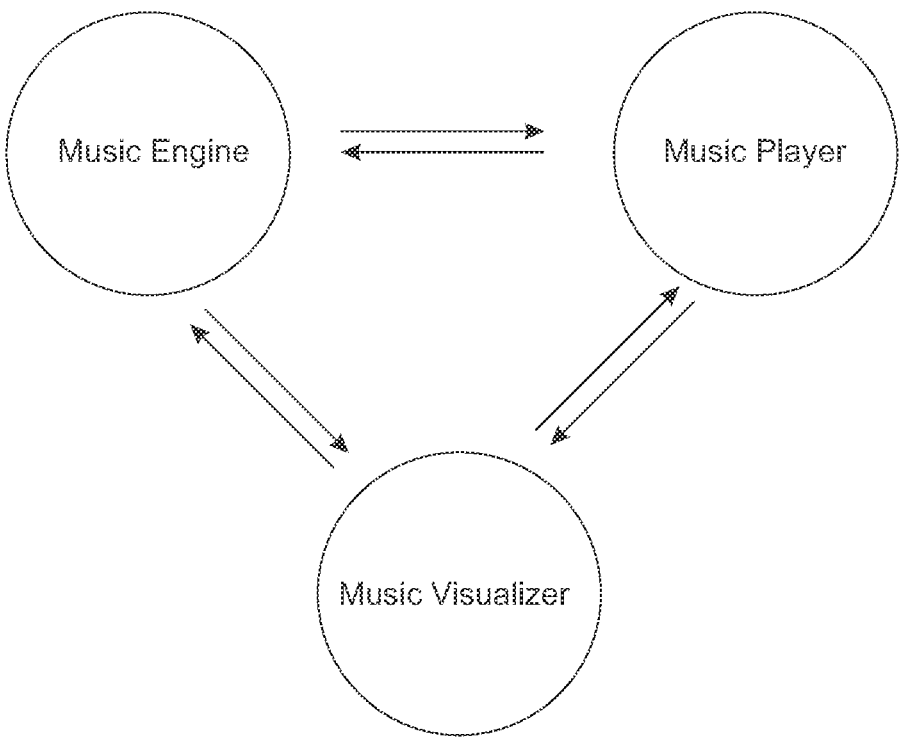
FIG. 1. High-level schematic of the Recordless system.

Reference will now be made in detail to presently preferred embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

When referring to a numerical quantity, in a refinement, the term "less than" includes a lower non-included limit that is 5 percent of the number indicated after "less than." A lower non-includes limit means that the numerical quantity being described is greater than the value indicated as a lower non-included limited. For example, "less than 20" includes a lower non-included limit of 1 in a refinement. Therefore, this refinement of "less than 20" includes a range between 1 and 20. In another refinement, the term "less than" includes a lower non-included limit that is, in increasing order of preference, 20 percent, 10 percent, 5 percent, 1 percent, or 0 percent of the number indicated after "less than."

With respect to electrical devices, the term "connected to" means that the electrical components referred to as connected to are in electrical communication. In a refinement, "connected to" means that the electrical components referred to as connected to are directly wired to each other. In another refinement, "connected to" means that the electrical components communicate wirelessly or by a combination of wired and wirelessly connected components. In another refinement, "connected to" means that one or more additional electrical components are interposed between the electrical components referred to as connected to with an electrical signal from an originating component being processed (e.g., filtered, amplified, modulated, rectified, attenuated, summed, subtracted, etc.) before being received to the component connected thereto.

The term "electrical communication" means that an electrical signal is either directly or indirectly sent from an originating electronic device to a receiving electrical device. Indirect electrical communication can involve processing of the electrical signal, including but not limited to, filtering of the signal, amplification of the signal, rectification of the signal, modulation of the signal, attenuation of the signal, adding of the signal with another signal, subtracting the signal from another signal, subtracting another signal from the signal, and the like. Electrical communication can be accomplished with wired components, wirelessly connected components, or a combination thereof.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

The term "electrical signal" refers to the electrical output from an electronic device or the electrical input to an electronic device. The electrical signal is characterized by voltage and/or current. The electrical signal can be stationary with respect to time (e.g., a DC signal) or it can vary with respect to time.

The terms "DC signal" refer to electrical signals that do not materially vary with time over a predefined time interval. In this regard, the signal is DC over the predefined interval. "DC signal" includes DC outputs from electrical devices and DC inputs to devices.

The terms "AC signal" refer to electrical signals that vary with time over the predefined time interval set forth above for the DC signal. In this regard, the signal is AC over the predefined interval. "AC signal" includes AC outputs from electrical devices and AC inputs to devices.

It should also be appreciated that any given signal that has a non-zero average value for voltage or current includes a DC signal (that may have been or is combined with an AC signal). Therefore, for such a signal, the term "DC" refers to the component not varying with time and the term "AC" refers to the time-varying component. Appropriate filtering can be used to recover the AC signal or the DC signal.

The term "electronic component" refers is any physical entity in an electronic device or system used to affect electron states, electron flow, or the electric fields associated with the electrons. Examples of electronic components include, but are not limited to, capacitors, inductors, resistors, thyristors, diodes, transistors, etc. Electronic components can be passive or active.

The term "electronic device" or "system" refers to a physical entity formed from one or more electronic components to perform a predetermined function on an electrical signal.

It should be appreciated that in any figures for electronic devices, a series of electronic components connected by lines (e.g., wires) indicates that such electronic components are in electrical communication with each other. Moreover, when lines directed connect one electronic component to another, these electronic components can be connected to each other as defined above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Throughout this application, where publications are referenced, the disclosures of these publications in their entireties are hereby incorporated by reference into this application to more fully describe the state of the art to which this invention pertains.

The term "audio file" means full, original audio selection.

The term "audio section" means a segment of an audio file as defined by producer agent.

The term "gain adjustments" means volume increases or decreases.

The term "arrangeable music" means music that has the ability to be rearranged in a custom fashion by audio sections.

The term "producer agent" means an entity that provides inputs that create arrangeable music.

The term "creator agent" means an entity that provides inputs that create custom arrangements.

The term "audio context" means a timeline that is created each time a validation of an arrangement is performed, or the arrangement is played, on which we can schedule events. The audio context can be instructed (i.e., at time 0, play this sound; or, at time 35, play this sound; or, at time 70, apply a filter to origin audio, etc.) The audio context can run the action as the arrangement is playing, or ahead of the play.

The term "scheduling time" means the time at which transition events are scheduled within an arrangement.

The term "last scheduled song time" means the last time in the original audio file at which an action has been scheduled.

The term "scheduling time delta" means 'transition out start time' minus 'last scheduled song time' gives duration of audio play time from one scheduled event to the next audio node or gain node.

The term "Camelot Wheel" means a translated system to describe musical key, scaled 1 through 12. Minor keys are designated with "A" and major keys are designated with "B."

The term "proprietary section agent" means a professional creator that provides audio content linking sections previously defined by producer agents.

The term "crossfade" means fading in one sound section while another sound section is fading out.

The term "TrackMods" refers to variations, and in particular, mastered variations of the of the same song or section of a song.

Abbreviations

"TMC" means TrackMod Creator.

In general, a method for remixing and/or restructuring audio within an audio file selection. The method includes steps of creating arrangeable music for a musical composition stored as an original audio file and creating a plurality of custom arrangements of the musical composition. Each custom arrangement of the plurality of custom arrangements is tailored to any combination of a location where a custom arrangement is to be played, a day of the week when the custom arrangement is played, an assessment of crowd participation, an activity that a user is engaged in, and an assessment of an emotional state of the user. The custom arrangements are provided on-demand to the user for execution. Characteristically, the steps are executed by a remixing/restructuring system (the Recordless system). In a refinement, the remixing/restructuring system includes a backend computing device such that at least one of the steps described above are at least partially executed on a backend computing device.

In a variation, the method includes a step of receiving inputs from the user to assist in selecting a custom arrangement. In a refinement, the inputs are provided by a user computing device. Examples of user computing devices include but are not limited to a smartphone, a smartwatch, a tablet, a laptop computer, or a desktop computer. In a refinement, the inputs are derived from one or more sensors and/or an input device in electrical communication with the user computing device. The one or more sensors may detect a property selected from the group consisting of location, heart rate, blood oxygen level, if the user is in motion and combinations thereof. In a refinement, the sensor can include video cameras that receive and analyze video in the vicinity of a user. The video can then be analyzed by a human or by an AI algorithm. The inputs can be provided automatically to a server for the selection of a custom arrangement. In a refinement, a music selection application is executed on the user computing device. In a refinement, the custom arrangement is automatically provided to the user upon receiving the inputs.

Referring to FIG. 1, a schematic for the custom creation and arrangement of audio files is provided. The Recordless system 10 includes a music engine 12, a music player 14, and an optional music visualizer 16. The Recordless music engine powers 12 the Recordless music format. At its core the music engine transitions between playing TrackMods, which are mastered variations of the same song or mastered variations of the same sections of a song. Transitions are taken when the mood (e.g., a coordinate composed of an energy and attitude ordinal) of the TrackMod better matches the current user's mood. Transitions are placed on a TrackMod at a certain time and end on another TrackMod at a later time. The music engine schedules an upcoming transition by scheduling a change in the mixer volumes of the two TrackMods. In a refinement, the mixer volume change moves the outgoing TrackMod volume to 0 and moves the incoming TrackMod volume to 1 over a defined period of time.

In a variation, each TrackMod has additional song elements that can play under certain moods. These additional song elements are one-shot elements that get played at a time only under a certain user mood.

The user can set a base mood. The energy ordinal of the mood is determined by observing the average accelerometer activity of the user shortly before and after the user sets their base mood. When accelerometer activity is sustained above the average, the music engine sets a higher temporary mood with a higher energy component and vice versa when the accelerometer activity is sustained below the average. The aggressiveness of this change (or the size of the range of averages) is controlled by the attitude component of the user's mood.

The engine can learn (i.e., by AI algorithms such as trained neural networks) to use a time of day, weather, and location to change temporary user mood by predicting user moods for selections in similar conditions. Furthermore, the engine can inject a random change into the user mood for a more dynamic listening experience and to power research.

The music player 14 allows a user to listen to interactive and normal songs. The player allows inputs from the user but also detects changes in their conditions (activity, location, weather changes) to feed to the music engine which ultimately controls song playback. Users are given the opportunity to input and change their mood during each song play.

The visualizer 16 changes its appearance based on the reported mood from the music engine. The visualizer displays how a user's condition triggers transitions across versions, both by changing the color and motion of the mood halo, but also by moving across record rings. Each record ring represents a version of the song inputted by the artist, allowing a visual element to supplement the auditory changes a user experiences. The mood halo not only represents the color of a user's mood, but also the energy of the current song version through its motion.

After a user completes one song play, the player will both store this special song play to history and also create a unique QR code specific to that song play. Users will be able to send and revisit song plays through this QR code, since each subsequent play will sound slightly different based on their future conditions. This can create certain pressure on fans to unlock TrackMods they do not currently have access to. When fans try to play TrackMods that they do not have access to, they are notified of the TrackMods they are missing and told how to unlock those TrackMods. This can create social pressure that combines nicely with the music marketplace and new monetization strategies for artists.

In a variation, the remixing/restructuring system enhances interactive music engineering and production consultation. This feature can be characterized by high touch or low touch. "High Touch" refers to the situation in which artists makes new material and/or uncovers old material to create TrackMods. "Low Touch" refers to the situation in which an artist approve Recordless TrackMod suggestions. In this regard, an artist/producer/engineer can be consulted to provide an idea of how to deliver source material that can fit their vision.

The music editor helps tie this all together so that a producer may develop a song for this format as easily as possible. The primary goal in designing this music editor is the elegance of the editor in the eyes of the music producer. The editor walks the producer through a process of getting the main TrackMods imported with mood assigned and transitions between them. The editor provides tools to check playback for phase correlation and loudness under stimulated user moods. The editor allows the producer to upload the interactive song package to the cloud for approval in the Recordless catalog.

Figure 2:
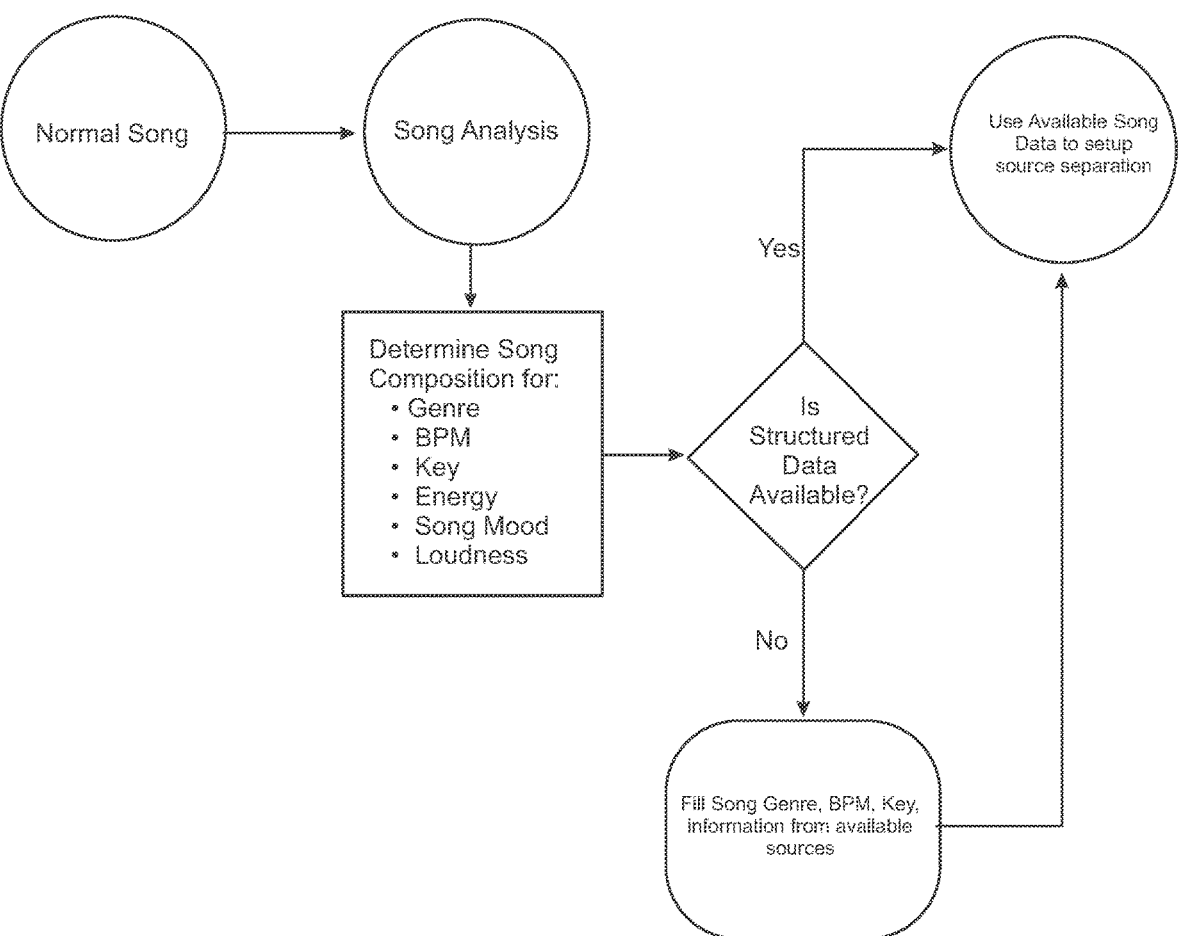
FIG. 2. A flowchart depicting the TrackMod creation process.

FIG. 2 provides a flowchart depicting the TrackMod creation process. For any song section, the best quality source separation should be obtained. In one refinement, original mix tracks are used with source separation algorithms being used (e.g. Spleeter). A substitute source is created by using producer defined material and performance and/or by using GAN supplied material and/or performance. In a refinement, the TrackMod sources are mastered with a target loudness equal to the original master In a variation, the remixing/restructuring system is configured for source separation and modification preparation. The TrackMod creator allows a producer to create individual TrackMods that are used by the Music Editor to create interactive songs. To do this. the TrackMod Creator (TMC) starts with a mastered song. The TMC attempts to find the best quality source separation tuning of source separation algorithms. To find the best quality separation, the TMC uses previous ratings of several sections of separation attempts with source separation presets that are good for the subjective quality of the music. After finding the best separation settings the TMC stores these settings for later use. After determining a track modification goal (such as changing the drum timing) the relevant source (e.g. drums) are extracted while a TrackMod negative or the remaining unselected sources (e.g. vocals, other, and bass) is also prepared. This process of source extraction can be repeated until the trackmod negative is empty.

Figure 3:
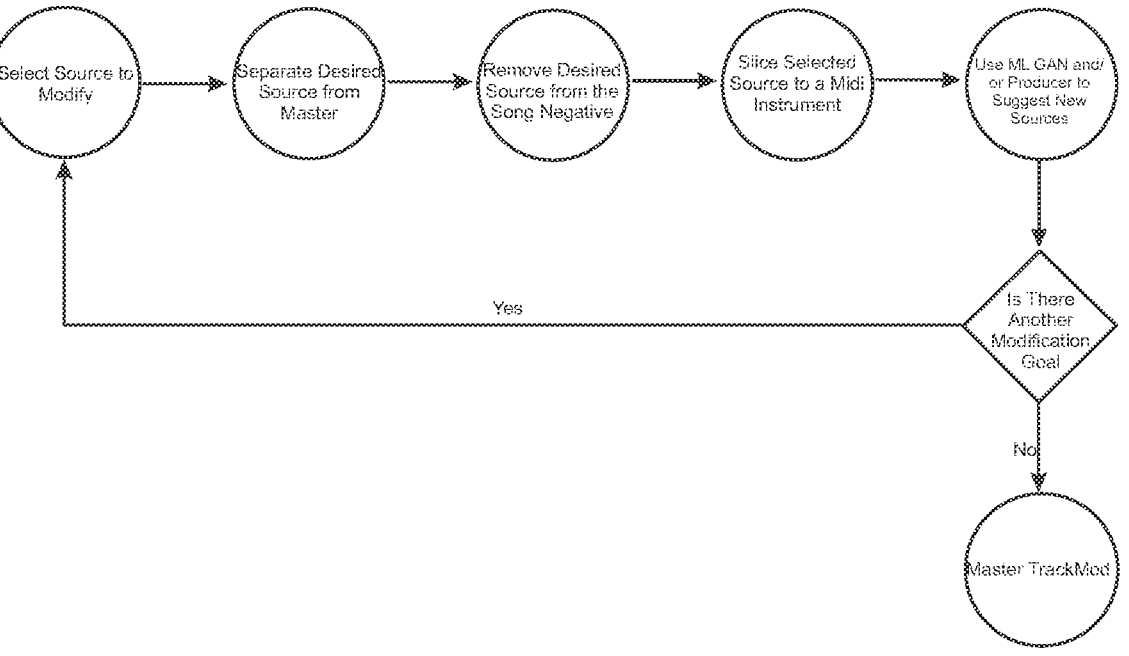
FIG. 3. A flowchart depicting the application of source modification.

In a variation, the remixing/restructuring system is configured to provide source modifications. FIG. 3 provides a flowchart depicting the application of source modification. To setup a source modification, the separated source is sliced to a MIDI instrument:

Monophonic Content: The best source sample for each source note and repitched samples present for notes not present in the source sliced to MIDI Keyboard Notes.

Polyphonic Content: Unique musical themes sliced out to MIDI Drum Notes.

Drum Content: The best source separation for each source drum note sliced to MIDI Drum Notes.

After the sources are prepared we can use a musical GAN machine learning model to produce a modified source or a user can supply a new modified (with or without reference to the prepared material). By storing the parameters used to set up the musical GAN ML model, the song composition, and rating the outcome, we can progressively train another ML model to suggest input parameters for the musical GAN ML model.

In a variation, the remixing/restructuring system is configured to provide source replacements. Alternatively rhythm, melody and/or chord information can be learned from other sources. By using compatible information from outside the song in question, a given musical motifs can be replaced with other workable musical motifs. For example, a ReDrum Module can be configured to change the drums of a song, the ReDrum module needs the best separation of the drum elements, the negative of this (a separation with other elements, vocal elements, and the bass elements), and the master or original track. The ReDrum module groups and separates individual drum sounds by commonality. For instance, in a track with a kick drum and snare drum it would group all instances of these sounds together and rank each occurrence of the sound by its separation quality. The ReDrum module then presents the producer with the opportunity to introduce these or other drum sounds into the track using a DAW of their choice. This allows the producer to alter drum timing, remove drums, and introduce new drums into a track.

Figure 4:
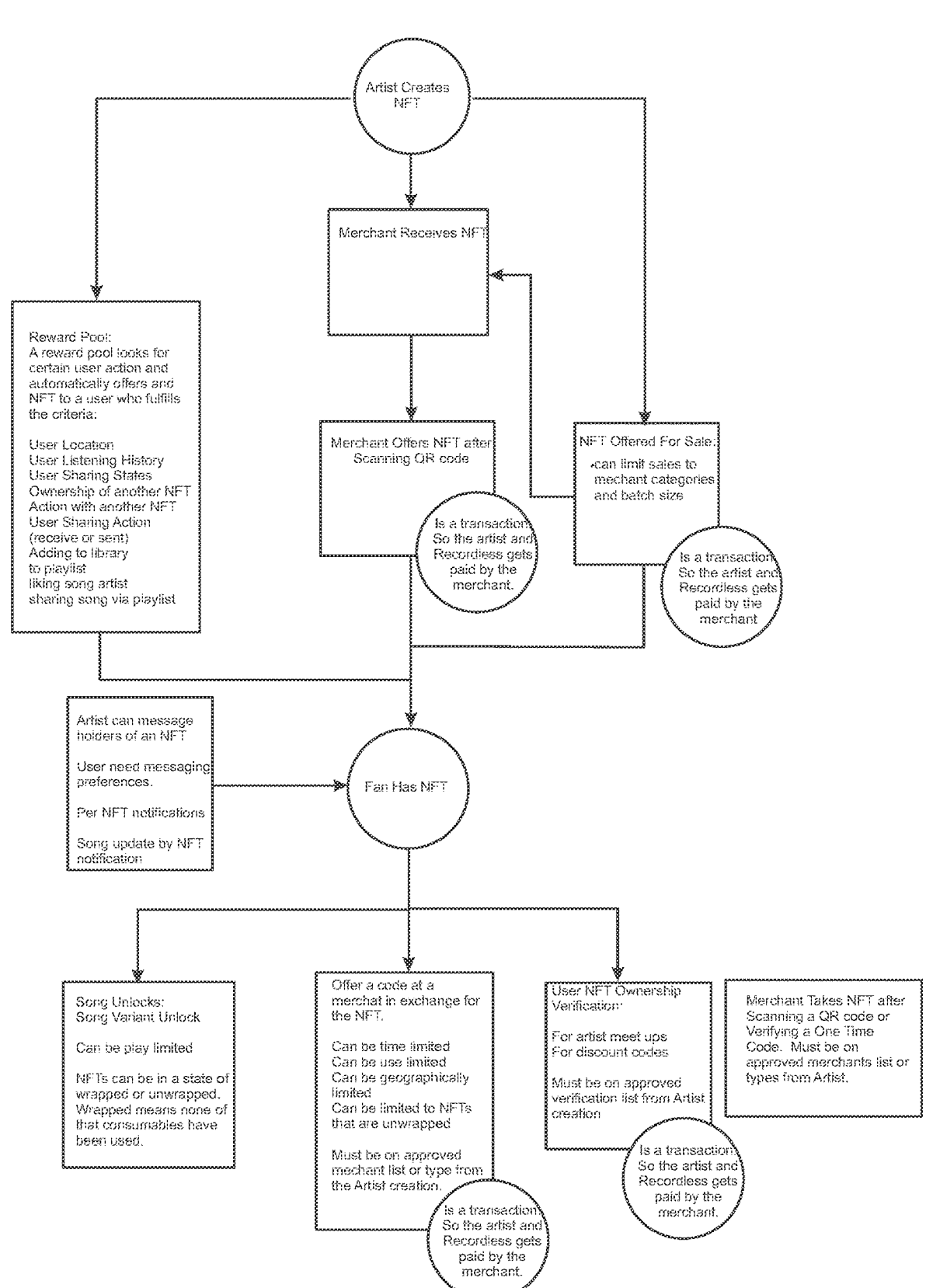
FIG. 4. A flowchart of an example of monetizing the Regardless system.

In a variation, the remixing/restructuring system can be used in the music marketplace. FIG. 4 provides a flowchart of an example of monetizing the Regardless system. In one refinement, subscription models, song/album purchase models, or more bespoke experiences are supported. Songs obtained from a wider streaming catalog are always available as part of a subscription service. However, songs that are provided only to Recordless, or TrackMods that are only available through our interactive music format can be locked behind a TrackMod-NFT. Put differently, artists can sell limited edition NFTs that unlock unique TrackMods. Furthermore, these NFTs can be time limited, location limited, or operate in conjunction with some experience. There are two types of TrackMod-NFT rewards. Those that are rewarded in app for certain behavior, and those that are rewarded outside the app for a certain behavior. For example, Rewarded In-App Behavior includes:

Song Listens

Artist Listens

Album Listens

Playlist Listens

TrackMod Listens

TrackMod-NFT Collection

Content Sharing

User Onboarding

Location

Movement Data Change

Phone Health+Fitness Data Change

For example, Rewarded Out-of-App Behavior can include:

Short Code Entering/QR Code Scanning

Partner Claim on User Behavior

Figure 5:
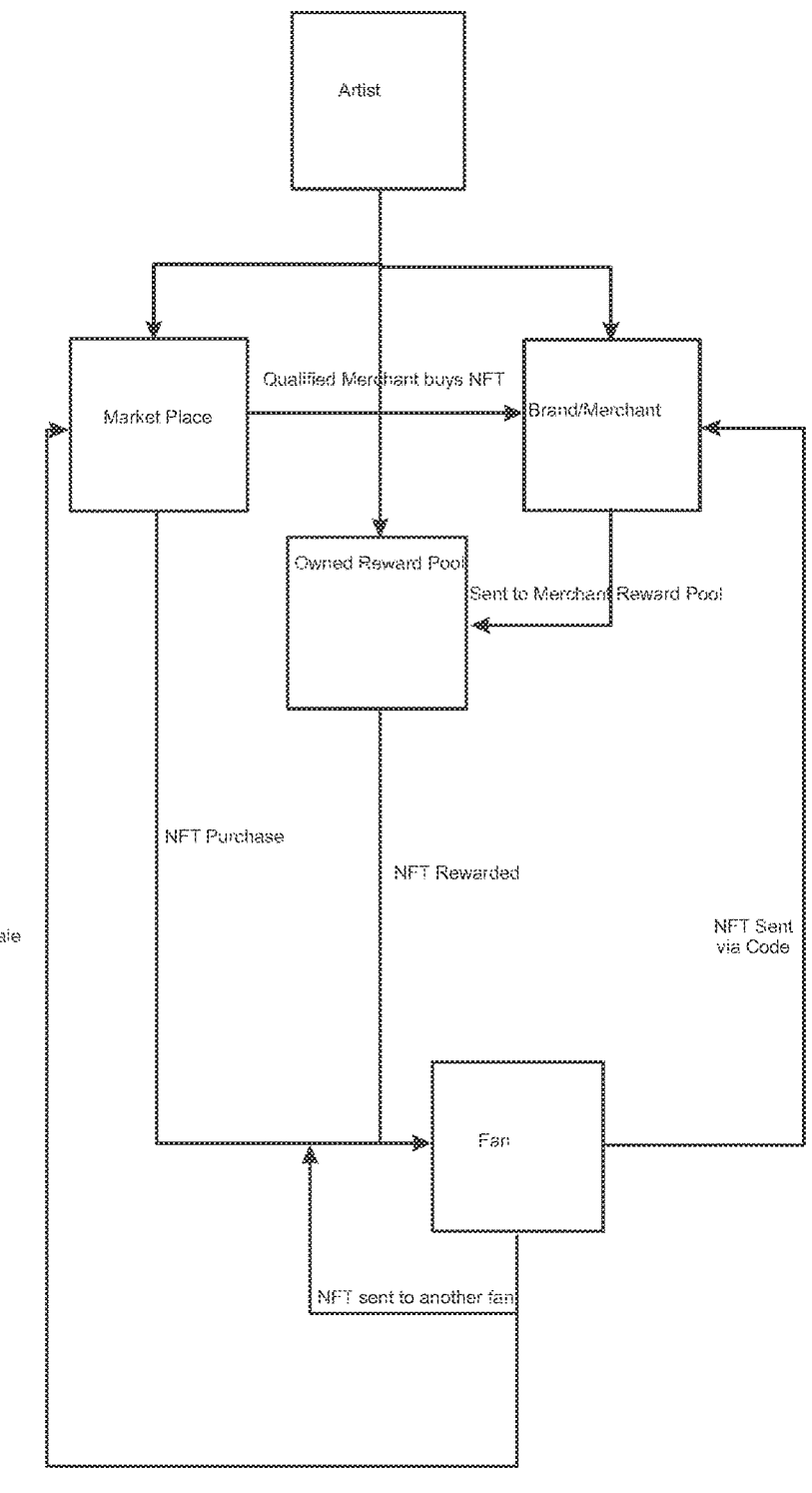
FIG. 5. A flowchart of an example of creating reward pools for the Regardless system.

In a refinement, TrackMod-NFTs are rewarded from reward pools which are objects that pool TrackMod-NFTs and have a combination of the above behavior as criteria a user has to pass before they are eligible to claim the TrackMod-NFT. FIG. 5 provides a flowchart of an example of creating reward pools for the Regardless system.

In a variation, reward pools are set up by either an artist or an approved partner. Reward pools are created with a set of reward criteria to earn the content. Listeners automatically track reward pools related to the content they engage with and can discover new reward pools to track in the marketplace. Once a user is tracking a reward pool, the system collects claims on qualifying user behavior and associates the behavior with both the user and the reward pool. On each new claim, the system checks to see if the reward pool criteria has been satisfied. Once the criteria have been satisfied the user may claim the applicable TrackMod-NFT reward. Reward pools criteria are logical combinations of rewarded behavior. The criteria can optionally be time ordered.

In a variation, the remixing/restructuring system can involve TrackMod-NFT deals and rights. In this regard, the TrackMod-NFTs can be associated with multiple external deals or rights.

In a variation, the remixing/restructuring system can provide important listening experiences. One such experience involves individual Listening. In this regard, Activity Curves can involve:

Day "Vibe"

Preset for Relaxation

Preset for Sensor/Location Tracking

Preset for Work

Another listening experience involves NFT Media Channel Listening. By selling NFT to represent TV schedule slots and allowing owners of a schedule slot to play NFT content, we create a NFT media channel.

In a refinement, the remixing/restructuring system can provide for joint listening. The Recordless platform can be used in bars, lounges, and small format clubs/warehouses to power joint listening experiences. The platform has a few touch points:

Webpage/App for Patrons

Touch Target Throughout the Space for Patrons to Check-In (Group Check-In)

Screens with Viz on Patron/Location/Mood

DJ Pad (people can add a scratch or a horn, or effect)?

In a refinement, sets for the bars can be created with adaptive songs, allow patrons to collectively control the mood of that adaptive song, and also create conditions under which adaptive songs get skipped or ended early. We can also do JukeBox Style song selection for 6-7 song sets (potentially also play song in your mood, or in the group's mood). JukeBox set selectors are prioritized to people who interacted with our app our the bar or brought big groups. Patrons can even be ranked as top "DJ" or something similar at the location. To do this we'd need a few different multi-hours sets. We can even allow users to vote on which set plays next.

In another refinement, "social games" such as mood roulette can be powered. (You elect to participate for social purposes, if another bar patron checks in with your same mood, you buy them a drink, you are both rewarded, etc.) Songs can adapt to app input from patrons. Also adapt to environmental cues (time of day, location, where people are coming from), background noise.

NFTs can be awarded to active users and unlock deals at the bar. They also can unlock trackmods (which might block playing certain sets) or allow users to vote for the next sets. They can be rewarded for ordering drinks, patronage stats in the bar, or participation in the app. The deals they offer can be drinks, or free entrance, or super "votes" or mood weighting.

Games Find the NFT in the bar. We can visualize where the NFT is in the bar. Poster with NFTs outside the bar.

In a variation, the remixing/restructuring system is configured to unlock NFTS for making new connections. For example, artists can be asked to record exclusive versions that we can play at high-end venues. It might be a version that is only available on that night at that location. It could also be a version of the song for a special event (like a birthday party). The system can be configured to do "license plate" personalization level of shout-outs in songs as NFTs by asking artists to make certain trackmods shouting out popular names and selling batches of them. We can also start to track patronage and venue stats.

In a variation, the remixing/restructuring system is configured to provide semi-choice listening experiences. For example, imagine being able to choose an adventure feature for a song, where you have some time to choose which direction a song goes in. In a refinement, the Recordless system can include interactive video and interactive pictures. This can be used to choose an adventure vein or not. In a refinement, the Recordless can include interactive podcasts, audio books, or guided tours.

Figures 6A, 6B:
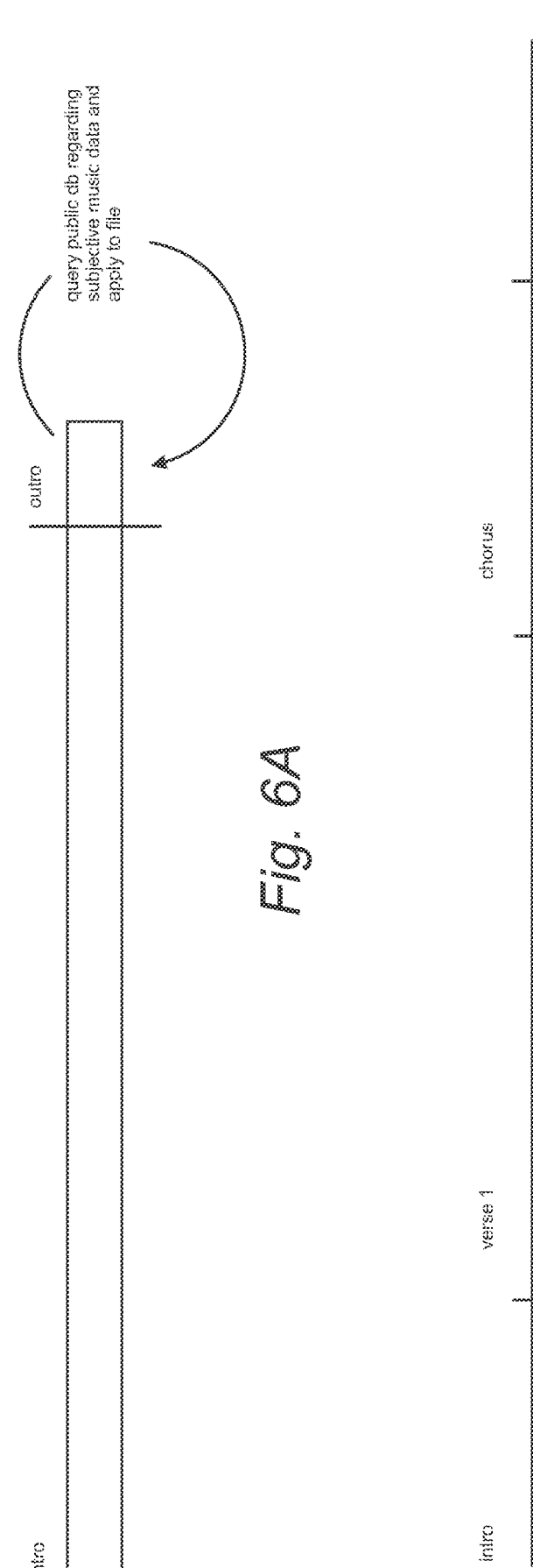
FIG. 6A. Schematic of an arrangeable music file.
FIG. 6B. Schematic of an arrangeable music file with a linked list.

In a variation, the Recordless system can include advanced transition types. In a refinement, the Recordless system provides fold-forward and fold-back transitions, the music engine can transition between secondary TrackMods of unequal length. A forward transition would align playback to a secondary TrackMod by aligning to a future point of main FIG. 6A provides a schematic of an arrangeable music file while FIG. 6B provides a schematic of an arrangeable music file with a linked list. In a variation, arrangeable music is created by loading audio file(s) into computer memory by an arrangement producer agent; loading alternate versions of the original audio file when there are multiple files into computer memory by a producer agent; optionally, batch querying public database for information regarding danceability, mood, energy, at particular times of the original audio file and associated the information with the original audio file; setting initial audio section fields as "intro" and "outro"; and defining additional section fields by the producer agent as a linked list, a combination of initial audio section fields and the additional section fields being characterized as start, middle, and end, where start sections have no previous section, but have a subsequent section, middle sections have both previous and subsequent sections, and end sections have no subsequent section, but have a previous section. Audio section field transitions are applied. Optionally, subjective song information from previously described database query is applied to song sections based on times.

Figure 7:
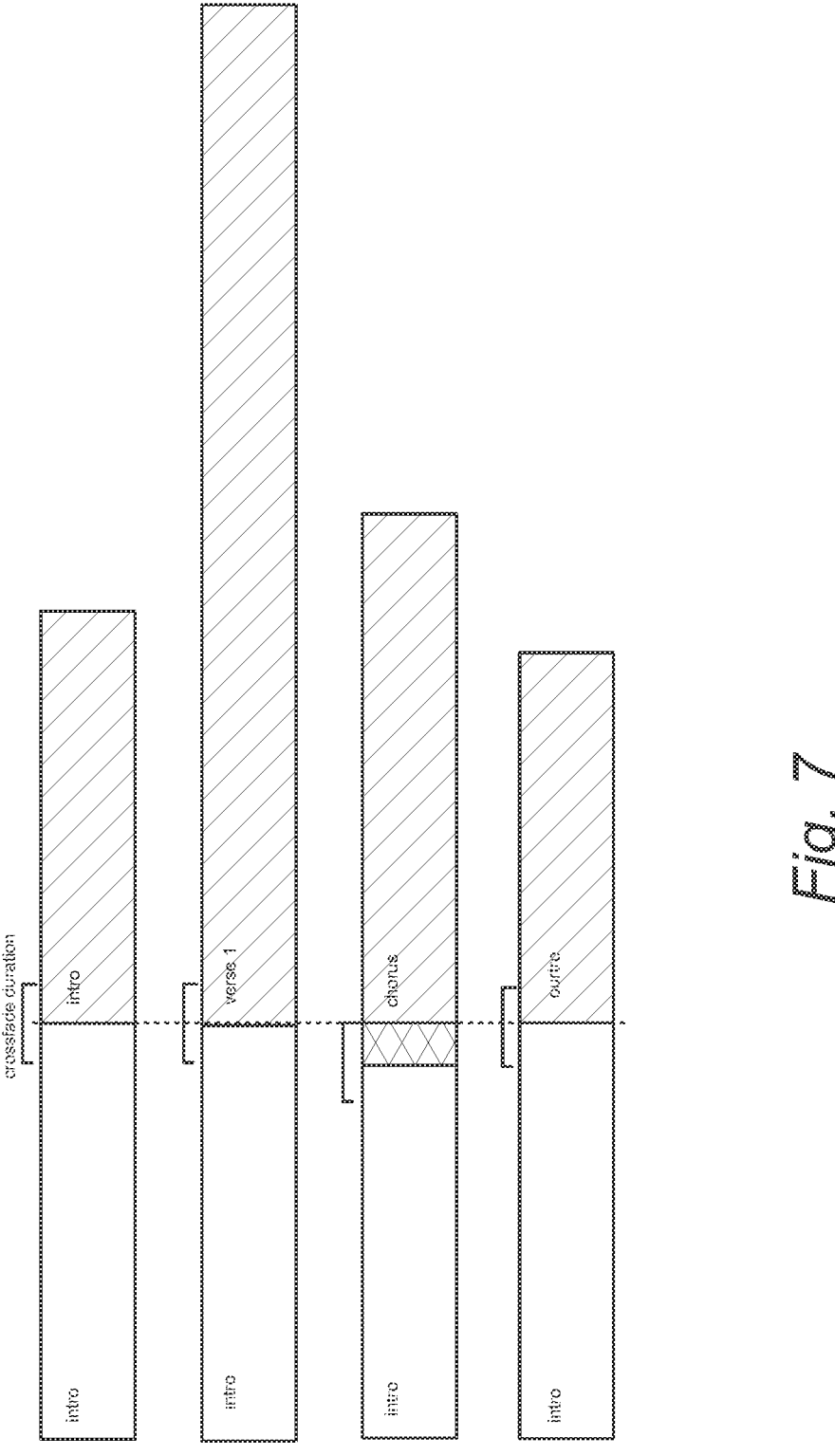
FIG. 7. Schematic of an arrangeable music file with transitions.

In a variation, the producer agent provides instructions regarding for timing and for a method for making gain adjustments between the audio section field transitions. FIG. 7 provides a schematic of an arrangeable music file with transitions. An example of creating a gain adjustment transition between an 'intro' section and 'verse 2' section proceeds as follows:

1. The origin section field is to play
2. Assign a fade out time point in intro section (likely near the end)
3. The destination section field is the section that will fade in audio
4. Assign a time point in the destination field at which the audio will begin playing
   a. "Snap-to" or other beat grid information will allow assist with timing
5. A crossfade time is designated, this is the amount of time both audio sections are playing simultaneously
6. The volume of the origin section field is decreased to zero over the duration of the crossfade time, while the destination section field's volume is increased maximally over the duration of the crossfade time.

In a variation, a creator agent defines a unique arrangement of audio sections from previously defined audio section data, the unique arrangement utilizing a list of audio section fields and an audio file reference, the list of audio sections being stitched together by transitions is an arrangement file.

In a variation, a transition plan validation is executed to verify that it is possible to play the unique arrangement by ensuring that there is a transition from each audio section to another audio section.

In a variation, there is an audio section field transition for each audio section field.

In a variation, the remixing/restructuring system is configured to move between the list of audio section field transitions with backend instruction processing, we take all audio sections in an arranged order as defined by the creator agent and we find an audio section field transition that will take us from an origin audio section to an appropriate destination audio section. Then we make a list of those transitions (as instruction information.).

Figure 8:
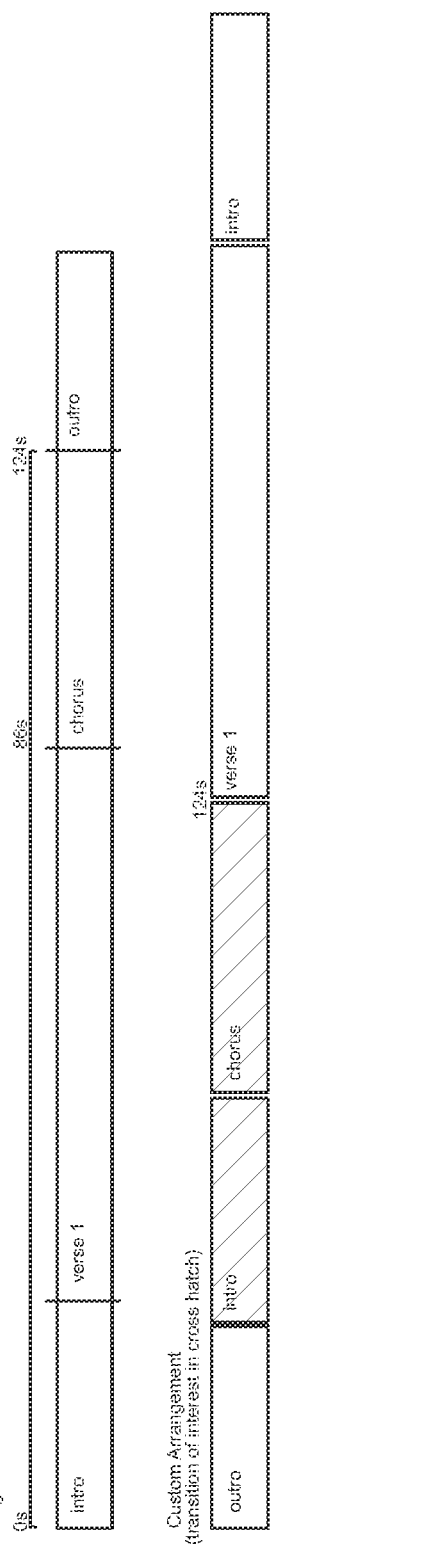
FIG. 8. Schematic of an arrangeable music file with rearranged sections and transitions.

In a variation, time points are considered in the backend in an initial audio file in order to create an audio context. Therefore, if an entire arrangement begins at the 'outro' of the audio file and ends at the conclusion of 'verse 2' of the audio file, the beginning of the arrangement song time is the time at which the audio file is called to play the 'outro' start and the end is the time at which the audio file is called to conclude playing 'verse 2'. In an example depicted in FIG. 8 for a single transition from 'intro' (beginning at time 0 s) to 'chorus' (beginning at time 86 s and ends at time 124 s):

1. Start song time is time 0 s and end song time is 124 s
2. out start time is the time point in the audio file at which the volume begins to decrease in the origin section,
3. in start time is the time point in the audio file at which the volume begins to increase in the destination section.
4. Transition duration is the crossfade time.

The transition plan must be validated as having a start (song start time), an end (end song time). For all transitions, including the middle ones, validate the referenced times are possible and occur within the duration of the referenced audio. The duration of the entire arrangement is determined by track scheduling time deltas for each transition point to define the times in the audio context at which transition events are to occur. The start window, middle windows, and end window are considered. The deltas (durations) are added to the scheduling time for each transition. The total value is the total time of the arrangement.

In a variation, the unique arrangement is executed by: loading the arrangement file; creating audio context; and iteratively scheduling audio playback and gain/effects adjustments according to a validated transition plan.

In a variation, custom instances of automatic remixing/restructuring of audio are applied between different audio file selections.

In a variation, the remixing/restructuring system is configured to allows transition between different songs.

In a variation, the remixing/restructuring system is configured to introduces an ability to create arrangeable music playlists.

In a variation, the remixing/restructuring system is configured to apply Custom instances of automatic remixing/restructuring of audio between musical selections with a change of tempo.

In a variation, the remixing/restructuring system is configured is configured to apply a tempo node set to provide additional transition instructions.

In a variation, a tempo map can be created manually by setting tempo markers at key points in a song. In a refinement, the tempo map is generated automatically by software that analyzes timing of a recorded performance. Additional transition instructions can include applying EQ, filters, loops, and/or special effect. In a refinement, additional transition instructions includes applying simulated scratching techniques. In a refinement, tempo is changed from a first song to a second song. In one example, a transition, the tempo of the second song starts at the tempo of the first song. In another example, at the transition, the tempo instantaneously or gradually revert to the original tempo of the second song. In another example, at the transition, the tempo gradually moves to the tempo of the second song to its original tempo with the first song fading.

In a variation, the remixing/restructuring system is configured such at a volume breakdown section of the first song, the second song starts at a normal tempo.

In a variation, the backend computing device is configured to add echo (specified count) on a designated count of a first song, then fade in or begin to play a second song. IN a refinement, the backend computing device is configured to designate a loop at the end of a first song section that will gradually change to the tempo of a second song starting section with filter elements being utilized over a designated time period as the first song mixes into the second song.

In a variation, custom instances of automatic remixing/restructuring of audio between musical selections are provided with a key change. In a refinement, an introduce key change node is set to provide additional transition instructions.

In a variation, the remixing/restructuring system is configured to implement a Camelot Wheel and key matching to find complementary keys and/or use of EQ, filters, loops, and special effects. In a refinement, the Camelot Wheel is applied by increasing either a first song or a second song in same scale (energy boost) usually harmonic or decreasing either the first song or the second song in same scale (lower energy) works well. In a refinement, the Camelot Wheel is applied by a relative major to minor switch or vice versa. In another refinement, the Camelot Wheel is applied by playing a subdominant key of relative major to minor or vice versa. In another refinement, the Camelot Wheel is applied by playing a dominant key of relative minor to a major. In another refinement, the Camelot Wheel is applied by Modulation mixing. In another refinement, the Camelot Wheel is applied by an energy boost and going up a whole step.

In another variation, custom instances of automatic remixing/restructuring of audio between musical selections are based upon subjective factors such as mood or energy.

In another variation, audio sections are encoded with subjective information such as danceability, mood, or energy.

In another variation, transition types carry implications for mood/energy.

In another variation, the remixing/restructuring system is configured for Automatic, progressive (just-in-time) generation of custom remixed audio between different musical selections.

In another variation, the remixing/restructuring system is configured to query a database of 'proprietary agent' created audio sections for unique transitions between producer agent defined sections.

In another variation, the remixing/restructuring system is configured to determine artist royalties based on custom music arrangements.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for restructuring of audio within an audio file selection, the method comprising:
   a) creating arrangeable music for a musical composition stored as an original audio file;
   b) creating a plurality of custom arrangements of the musical composition, each custom arrangement of the plurality of custom arrangements being tailored to any combination of a location where a custom arrangement is to be played, a day of the week when the custom arrangement is played, an assessment of crowd participation, activity that a user is engaged in, and an assessment of an emotional state of the user; and
   c) providing on-demand the custom arrangements to the user for execution, wherein steps a), b), and c) are executing by a remixing/restructuring system that includes a backend computing device such that at least one of steps a), b), and c) are at least partially executed on a backend computing device wherein creating the arrangeable music data comprises:
   loading audio file(s) into computer memory by an arrangement producer agent, the audio files optionally including associated stems;
   loading alternate versions of the original audio file when there are multiple files into computer memory by a producer agent;

batch querying database for information regarding danceability, mood, or energy, at particular times of the original audio file and associated the information with the original audio file;
setting initial audio section fields as "intro" and "outro";
defining additional section fields by the producer agent as a linked list, or another data structure that identifies a predecessor and successor for each section, a combination of initial audio section fields and the additional section fields being characterized as start, middle, and end, where start sections have no previous section, but have a subsequent section, middle sections have both previous and subsequent sections, and end sections have no subsequent section, but have a previous section;
creating audio section field transitions; and
applying subjective song information from previously described database query to song sections based on times.

2. The method of claim 1 further comprising receiving inputs from the user to assist in selecting a custom arrangement.

3. The method of claim 2, wherein the inputs from the user are provided by a user computing device.

4. The method of claim 3, wherein the user computing device is a smartphone, a smart watch, a tablet, a laptop computer, or a desktop computer.

5. The method of claim 3, wherein the inputs comprise signals derived from one or more sensors and/or an input device in electrical communication with the user computing device.

6. The method of claim 5, wherein the inputs are provided automatically.

7. The method of claim 6, wherein the custom arrangement is automatically provided to the user upon receiving the inputs.

8. The method of claim 5, wherein the one or more sensors detect a property selected from the group consisting of location, heart rate, blood oxygen level, if the user is in motion, and combinations thereof.

9. The method of claim 1, wherein the producer agent provides instructions regarding for timing and for a method for making gain adjustments between the audio section field transitions.

10. The method of claim 1, wherein a creator agent defines a unique arrangement of audio sections from previously defined audio section data, the unique arrangement utilizing a list of audio section fields and an audio file reference, the list of audio sections being stitched together by transitions is an arrangement file.

11. The method of claim 10, wherein a transition plan validation is executed to verify that it is possible to play the unique arrangement by ensuring that there is a transition from each audio section to another audio section.

12. The method of claim 10, wherein there is an audio section field transition for each audio section field.

13. The method of claim 10, wherein the remixing/restructuring system is configured to move between the list of audio section field transitions with backend instruction processing, such that all audio sections are taken in an arranged order as defined by the creator agent, and an audio section field transition is identified that enables movement from an origin audio section to an appropriate destination audio section.

14. The method of claim 10, wherein time points are considered in the backend in a initial audio file in order to create an audio context.

15. The method of claim 10, wherein the unique arrangement is executed by:

loading the arrangement file;

creating audio context; and iteratively scheduling audio playback and gain/effects adjustments according to a validated transition plan.

16. The method of claim 1, wherein custom instances of automatic remixing/restructuring of audio are applied between different audio file selections.

17. The method of claim 1, wherein the remixing/restructuring system is configured to allows transition between different songs.

18. The method of claim 1, wherein the remixing/restructuring system is configured to introduces an ability to create arrangeable music playlists.

19. The method of claim 1, wherein the remixing/restructuring system is configured to apply Custom instances of automatic remixing/restructuring of audio between musical selections with a change of tempo.

20. The method of claim 1, wherein a backend computing device is co-resident with, or the same physical device as the user computing device.

* * * * *